(12) United States Patent
Chen

(10) Patent No.: US 11,953,817 B2
(45) Date of Patent: Apr. 9, 2024

(54) WHEEL AND PROJECTION DEVICE

(71) Applicant: Coretronic Corporation, Hsin-Chu (TW)

(72) Inventor: I-Hua Chen, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/981,473

(22) Filed: Nov. 7, 2022

(65) Prior Publication Data

US 2023/0168570 A1 Jun. 1, 2023

(30) Foreign Application Priority Data

Nov. 9, 2021 (CN) .......................... 202122721517.8

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC ............................ G03B 21/204; G02B 26/008
See application file for complete search history.

(56) References Cited

U.S. PATENT DOCUMENTS

| 2019/0146318 | A1* | 5/2019 | Hsieh | G03B 21/204 |
| | | | | 362/84 |
| 2019/0353994 | A1* | 11/2019 | Hsu | G03B 21/16 |
| 2020/0004118 | A1* | 1/2020 | Hsu | G02B 26/008 |

FOREIGN PATENT DOCUMENTS

| CN | 208188568 | 12/2018 |
| CN | 210605321 | 5/2020 |
| TW | 201626093 | 7/2016 |
| TW | 202105036 | 2/2021 |

* cited by examiner

Primary Examiner — Evan P Dzierzynski
Assistant Examiner — Nathaniel J Lee
(74) Attorney, Agent, or Firm — JCIPRNET

(57) ABSTRACT

A wheel provided by the disclosure includes a substrate, a driving component, a clamping element and a balance component. The driving component is connected to the substrate, and is configured to drive the substrate to rotate about the axis of the driving component as the central axis. The clamping element is arranged on the substrate along the axis, and the clamping element includes a plurality of protruding structures. The balance component includes a balance substance and an adhesive. The balance substance is arranged on the protruding structure, and the adhesive covers the balance substance and the protruding structure to fix the balance component on the clamping element. The wheel and projection device provided by the disclosure have better structural reliability and heat dissipation efficiency.

15 Claims, 14 Drawing Sheets

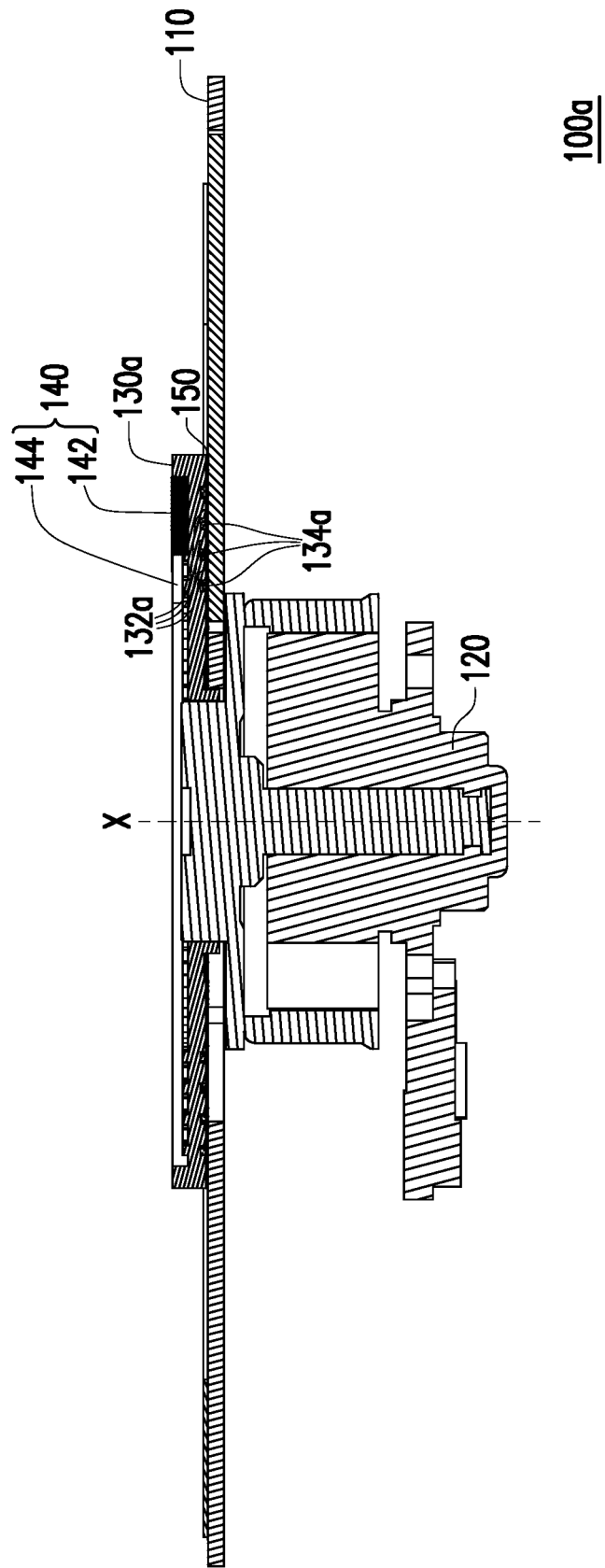

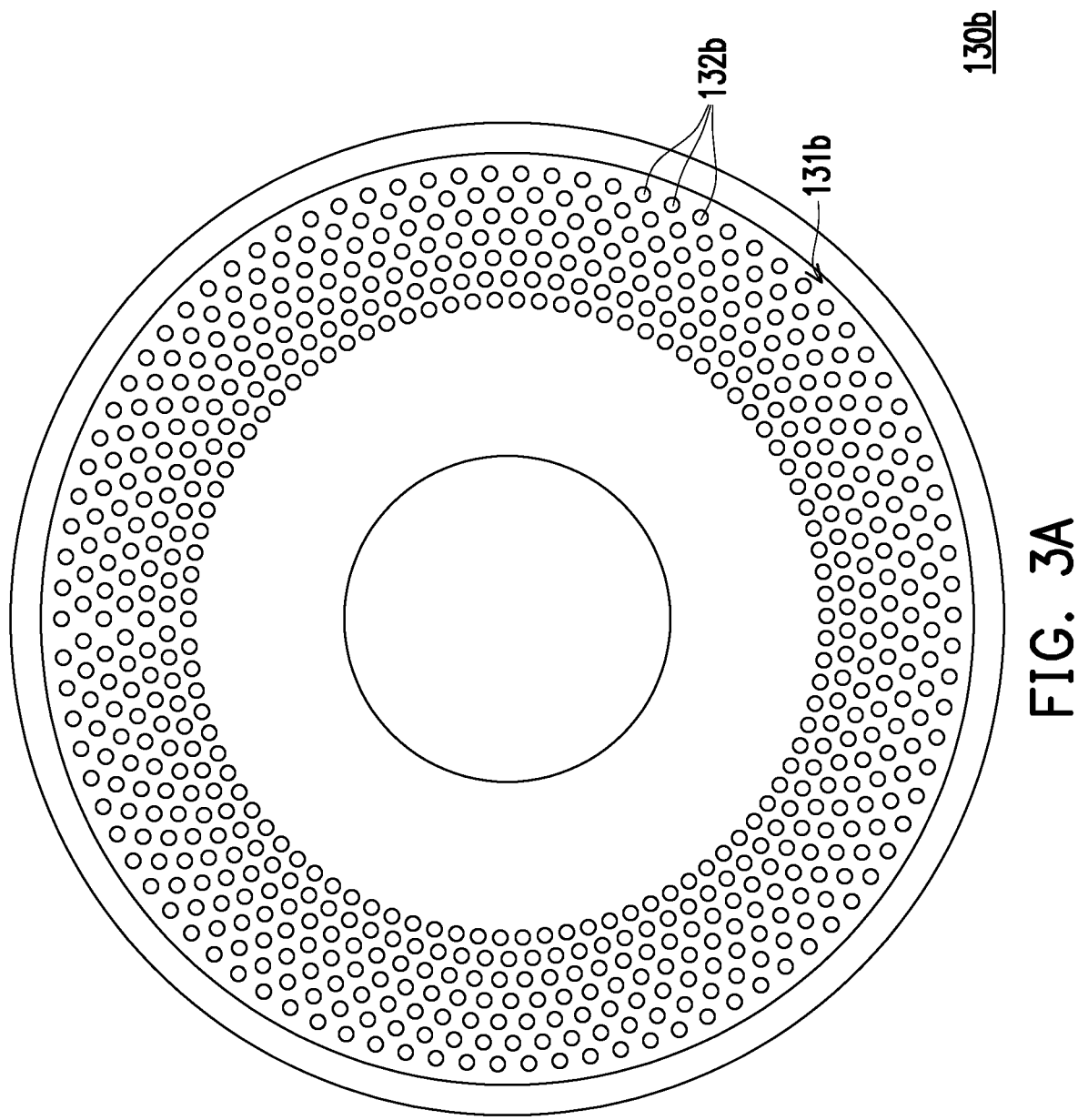

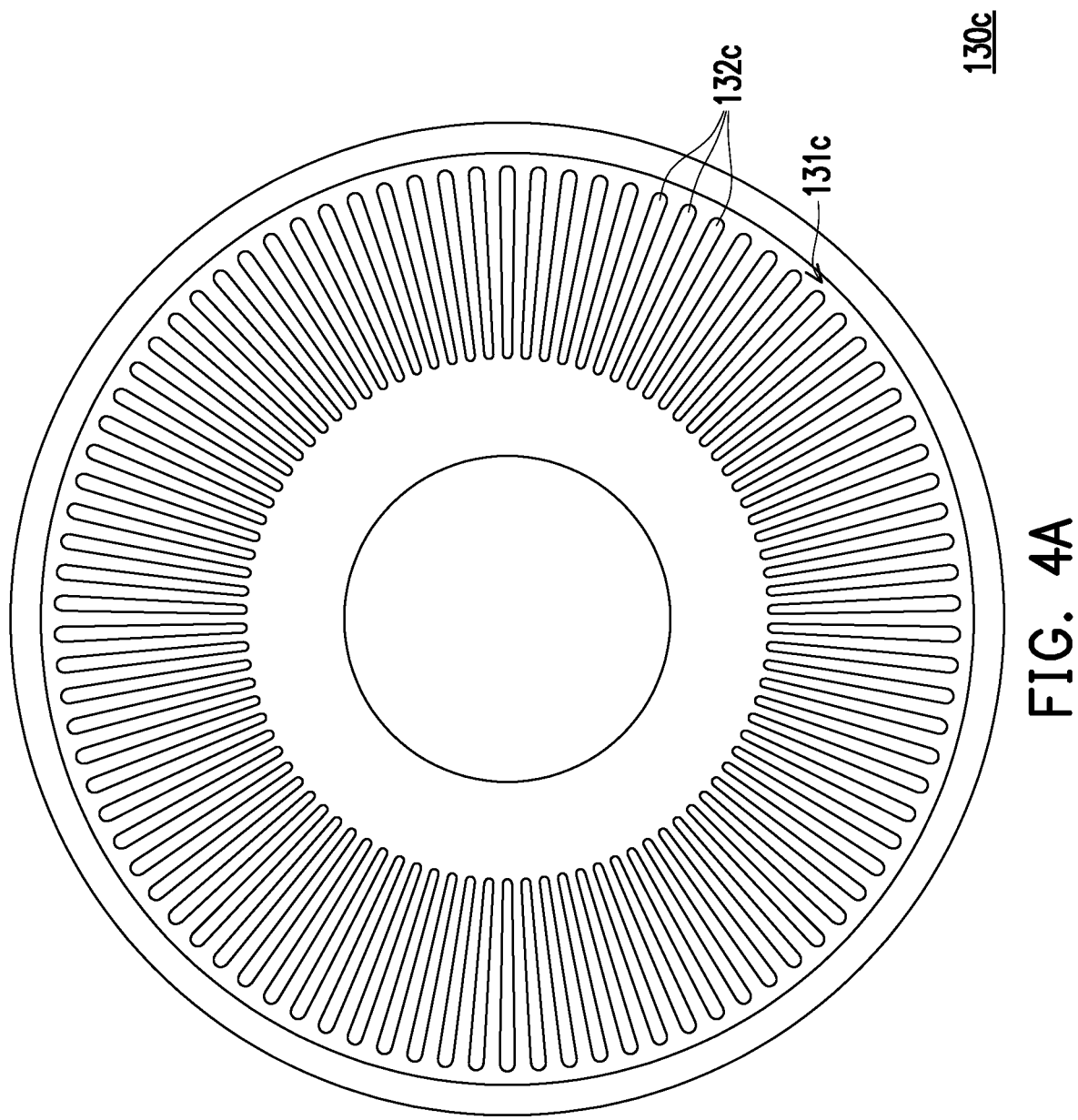

WHEEL AND PROJECTION DEVICE

CROSS-REFERENCE TO RELATED APPLICATION

This application claims the priority benefit of China application serial no. 202122721517.8, filed on Nov. 9, 2021. The entirety of the above-mentioned patent application is hereby incorporated by reference herein and made a part of this specification.

BACKGROUND OF THE DISCLOSURE

Field of the Disclosure

The disclosure relates to a wheel and a projection device, and more particularly to a wheel with better structural reliability and can rotate smoothly, and a projection device using the wheel.

Description of Related Art

The existing wheel (such as a phosphor wheel) mainly includes a substrate, a wavelength conversion layer, a coated glass, a driving component (such as a motor), and a clamping element (such as a clamping ring). The clamping element mainly serves to connect the coated glass and the substrate and connect a balance component (such as a component providing correction mass for dynamic balance). The position where the existing clamping component filled with the balance component is a flat surface. Therefore, the bonding area for the adhesive material (such as ultraviolet curing adhesive) that adheres the balance component to the clamping element is small. Besides, it is difficult to cure the adhesive entirely since the curing beam (such as ultraviolet light) is not easily irradiated to the adhesive covered by the balance component. Moreover, since the position where the clamping component filled with the balance component is a flat surface, there is no additional structure to enhance the bonding strength, the balance component will easily fall off when the wheel rotates at high speed. Furthermore, when the balance component falls off, the vibration and noise of the wheel will increase, which is likely to cause damage to the driving component and malfunction of the wheel. In addition, the existing clamping element does not have a turbulent structure, and the adhesive used to adhere the clamping element to the balance component has a long-term temperature resistance of less than 150° C. Therefore, when the temperature of the clamping element is greater than 150° C., the adhesive will lose its bonding function due to deterioration of material.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides a wheel, which has better structural reliability and heat dissipation efficiency, and corrects the uneven mass distribution of the wheel.

The disclosure further provides a projection device, which includes the above-mentioned wheel, so that the projection device has better projection quality and product competitiveness.

In order to achieve one or part or all of the above purpose or other purposes, an embodiment of the disclosure provides a wheel, which includes a substrate, a driving component, a clamping element, and a balance component. The driving component is connected to the substrate, and is configured to drive the substrate to rotate about the axis of the driving component as the central axis. The clamping element is arranged on the substrate along the axis, and the clamping element includes a plurality of protruding structures. The balance component includes a balance substance and an adhesive. The balance substance is arranged on the protruding structure, and the adhesive covers the balance substance and the protruding structure to fix the balance component on the clamping element.

In an embodiment of the disclosure, there are a plurality of gaps between the protruding structures, and the adhesive is filled in the gaps to fix the balance component on the clamping element.

In an embodiment of the disclosure, the balance substance is connected to the protruding structure through the adhesive.

In an embodiment of the disclosure, the protruding structures are arranged in a ring shape at equal intervals.

In an embodiment of the disclosure, the clamping element has a configuration surface, and the protruding structures are distributed on the configuration surface.

In an embodiment of the disclosure, the clamping element further has a rear surface opposite to the configuration surface, and the clamping element further includes a plurality of recessed structures, and the recessed structures are distributed on the rear surface.

In an embodiment of the disclosure, the depth of each of the recessed structures is greater than or equal to 0.1 millimeter (mm).

In an embodiment of the disclosure, the wheel further includes an adhesive layer disposed between the substrate and the clamping element. There are a plurality of gaps between the recessed structures, and the adhesive layer fills the gaps to fix the clamping element on the substrate.

In an embodiment of the disclosure, the orthographic projection of the recessed structure on the configuration surface completely overlaps the protruding structure.

In an embodiment of the disclosure, the shape of the recessed structure includes a cylindrical shape, a strip shape, or a combination of the foregoing.

In an embodiment of the disclosure, the shape of the protruding structure includes a cylindrical shape, a strip shape, or a combination of the foregoing.

In an embodiment of the disclosure, the height of each of the protruding structures is greater than or equal to 0.1 mm.

In an embodiment of the disclosure, the protruding structure has a first region and a second region. The range of the first region is larger than the range of the second region, and the balance component is located in the second region.

In an embodiment of the disclosure, the shape of the substrate and the shape of the clamping element are respectively a hollow ring. The substrate and the clamping element are respectively arranged coaxially with the driving component.

In order to achieve one or part or all of the above purpose or other purposes, an embodiment of the disclosure provides a projection device, which includes an illumination module, a light valve, and a projection lens. The illumination module includes a light source device and a wheel, and the illumination module is configured to provide an illumination beam. The wheel is arranged on a transmission path of an excitation beam provided by the light source device. The wheel includes a substrate, a driving component, a clamping element and a balance component. The driving component is connected to the substrate, and is configured to drive the substrate to rotate about the axis of the driving component as the central axis. The clamping element is arranged on the substrate along the axis, and the clamping element includes a plurality of protruding structures. The balance component includes a balance substance and an adhesive. The balance substance is arranged on the protruding structure, and the adhesive covers the balance substance and the protruding structure to fix the balance component on the clamping element. The light valve is arranged on a transmission path of the illumination beam from the wheel to convert the illumination beam into an image beam. The projection lens is arranged on a transmission path of the image beam to project the image beam out of the projection device.

Based on the above, the embodiments of the disclosure have at least one of the following advantages or effects. In the design of the wheel of the disclosure, the clamping element includes a protruding structure, and the balance substance of the balance component is arranged on the protruding structure, and the adhesive of the balance component covers the balance substance and the protruding structure to fix the balance component on the clamping element. With the design of the protruding structure, the bonding area between the adhesive and the clamping element and the bonding strength can be increased, so that the wheel of the disclosure can have better structural reliability. Furthermore, the design of the protruding structure also has a turbulence function, which can effectively improve the heat dissipation efficiency of the wheel of the disclosure. In addition, the projection device using the wheel of the disclosure can have better projection quality and product competitiveness.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate of the disclosure and, together with the description, serve to explain the principles of the disclosure.

FIG. 2C is a schematic cross-sectional view of FIG. 2B.

FIG. 3A is a schematic top view of a clamping element according to an embodiment of the disclosure.

FIG. 4A is a schematic top view of a clamping element according to another embodiment of the disclosure.

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
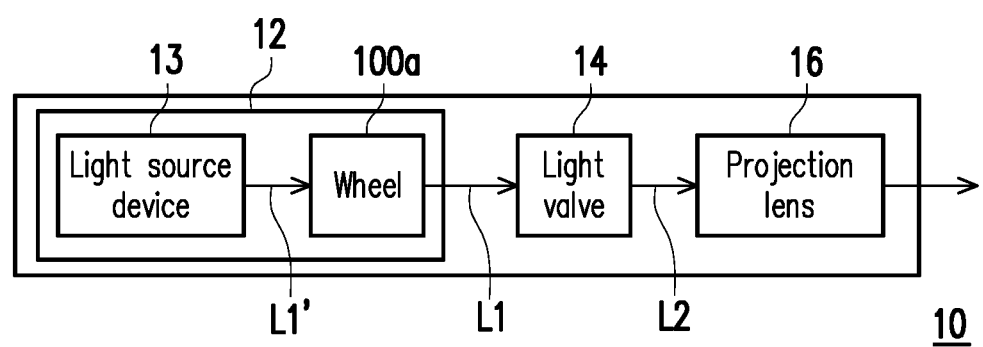
FIG. 1 is a schematic view of a projection device according to an embodiment of the disclosure.

FIG. 1 is a schematic view of a projection device according to an embodiment of the disclosure. Please refer to FIG. 1, in this embodiment, the projection device 10 includes an illumination module 12, a light valve 14 and a projection lens 16. The illumination module 12 includes a light source device 13 and a wheel 100a, and the illumination module 12 is configured to provide an illumination beam L1. The wheel 100a is arranged on a transmission path of an excitation beam L1' provided by the light source device 13. The wheel 100a can be, for example, a phosphor wheel, a filtering color wheel, or a diffusing wheel. Different parts of the wheel 100a enters the transmission path of the excitation beam L1' in a sequential manner to generate the illumination beam L1.

The light valve 14 is arranged on the transmission path of the illumination beam L1 from the wheel 100a to convert the illumination beam L1 into an image beam L2. The projection lens 16 is disposed on the transmission path of the image beam L2 to project the image beam L2 out of the projection device 10.

Furthermore, the light source device 13 used in this embodiment is, for example, a laser diode (LD), a laser diode bank, or a light emitting diode (LED). Specifically, any light source that meets the volume requirement in actual design can be used for implementation, and this embodiment is not limited thereto. The light valve 14 is, for example, a reflective light modulator such as a liquid crystal on silicon panel (LCoS panel) or a digital micro-mirror device (DMD). In an embodiment, the light valve 14 is, for example, a transparent liquid crystal panel, an electro-optical modulator, a magneto-optic modulator, an acousto-optic modulator (AOM) and other transmissive light modulators, but the embodiment provides no limitation to the form and type of the light valve 14. The detailed steps and implementation of the method for the light valve 14 to convert the illumination beam L1 into the image beam L2 can be obtained from general knowledge in the technical field with sufficient teaching, suggestion and implementation description, and therefore no further description will be incorporated herein. In addition, the projection lens 16 includes, for example, a combination of one or more optical lenses having refractive power, such as various combinations of non-planar lenses such as biconcave lenses, biconvex lenses, meniscus lenses, convex-concave lenses, plano-convex lenses, and plano-concave lenses. In an embodiment, the projection lens 16 may also include a planar optical lens to project the image beam L2 from the light valve 14 out of the projection device 10 in a reflective or penetrative manner. Here, this embodiment provides no limitation to the form and type of the projection lens 16.

Figure 2A:
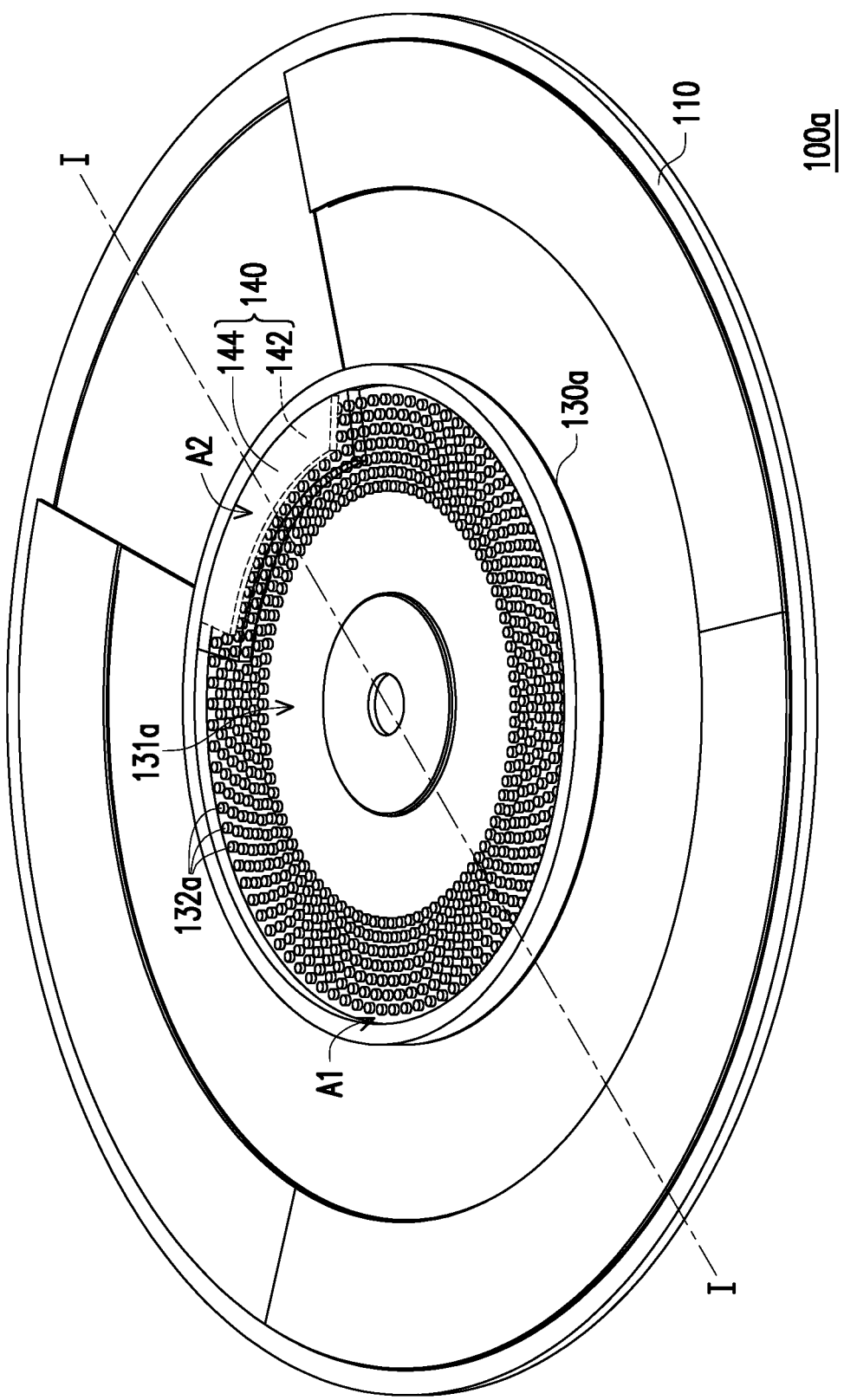
FIG. 2A is a three-dimensional schematic view of a wheel of the projection device of FIG. 1.
Figure 2B:
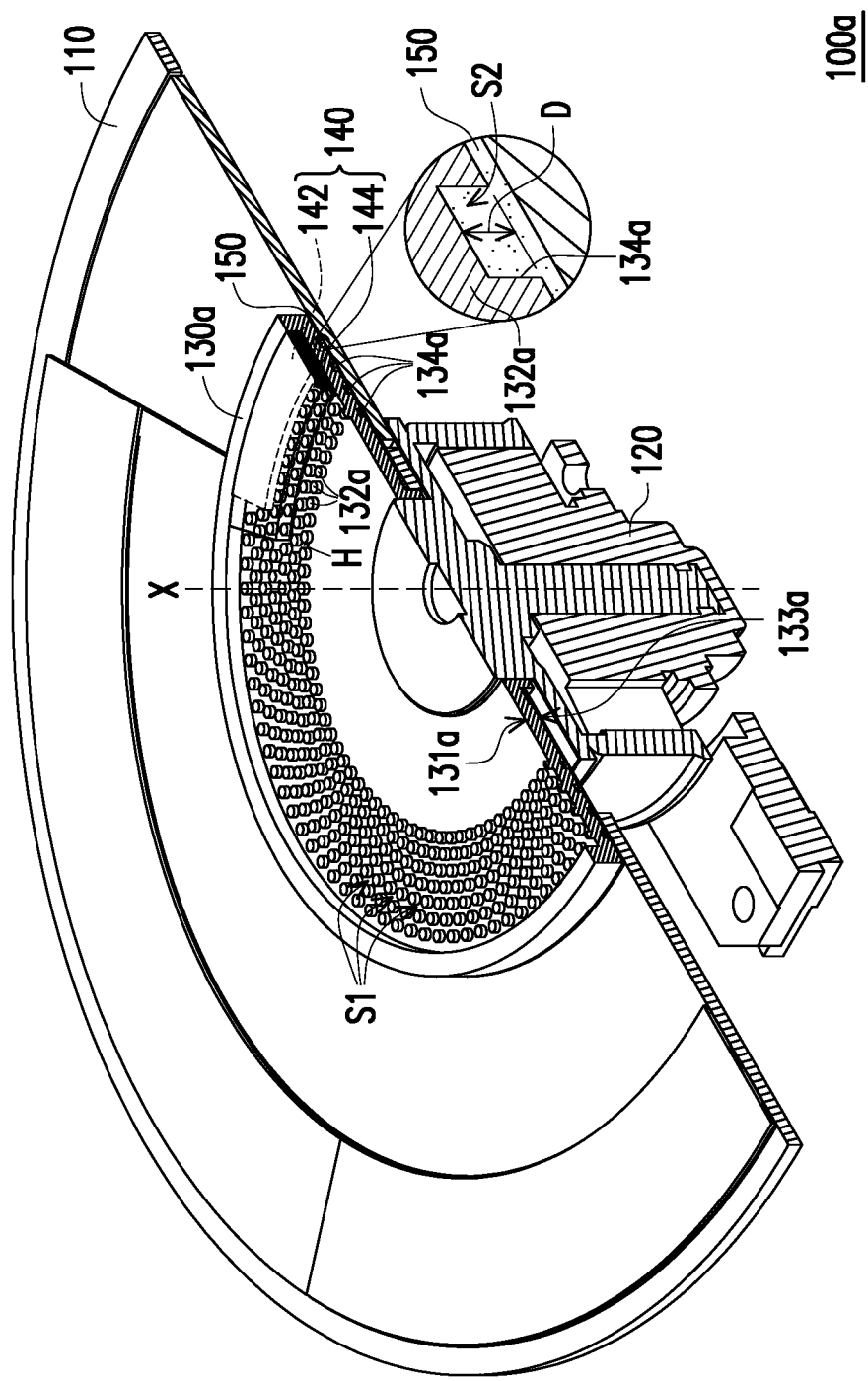
FIG. 2B is a schematic three-dimensional cross-sectional view taken along the line I-I in FIG. 2A.

FIG. 2A is a three-dimensional schematic view of a wheel of the projection device of FIG. 1. FIG. 2B is a schematic three-dimensional cross-sectional view taken along the line I-I in FIG. 2A. FIG. 2C is a schematic cross-sectional view of FIG. 2B. Please refer to FIG. 2A, FIG. 2B and FIG. 2C at the same time. In this embodiment, the wheel 100a includes a substrate 110, a driving component 120, a clamping element 130a, and a balance component 140. The driving component 120 is connected to the substrate 110, and the driving component 120 is configured to drive the substrate 110 to rotate about the axis X of the driving component 120 as the central axis. The clamping element 130a is disposed on the substrate 110 along the axis X, and the clamping element 130a includes a plurality of protruding structures 132a. The balance component 140 includes a balance substance 142 and an adhesive 144. The balance substance 142 is disposed on the protruding structure 132a, and the adhesive 144 covers the balance substance 142 and the protruding structure 132a, and the balance component 140 is fixed on the clamping element 130a through the adhesive property of the adhesive 144.

In detail, in this embodiment, the shape of the substrate 110 and the shape of the clamping element 130a are, for example, hollow rings, respectively, and the substrate 110 and the clamping element 130a are respectively arranged coaxially with the driving component 120. The clamping element 130a of this embodiment is, for example, manufactured by computer numerical control (CNC) machining, stamping, casting, forging, or sintering. Here, the material of the clamping element 130a is, for example, metal or ceramic, and the metal is, for example, aluminum, aluminum alloy, stainless steel, copper, or copper alloy, and the ceramic is, for example, aluminum nitride or aluminum oxide, but it is not limited thereto.

Furthermore, the clamping element 130a of this embodiment has a configuration surface 131a, and the protruding structures 132a are distributed on the configuration surface 131a. As shown in FIG. 2A and FIG. 2B, the plurality of protruding structures 132a are, for example, arranged in a ring shape at equal intervals, and the shape of the protruding structures 132a is, for example, a cylindrical shape, a strip shape, or a combination of the foregoing, and the strip shape can be a straight strip shape or a curved strip shape, but the disclosure provides no limitation to the shape of the protruding structure 132a. Further, for example, an area of the configuration surface 131a at the inner side of the ring arranged by the protruding structures 132a may be a flat surface, but the disclosure is not limited thereto. Preferably, the height H of each of the protruding structures 132a is, for example, greater than or equal to 0.1 mm. Since the plurality of protruding structures 132a are arranged at equal intervals, there are a plurality of gaps S1 between the plurality of protruding structures 132a, and the adhesive 144 is filled in the gaps S1, so that the balance component 140 can be fixed on the clamping element 130a. Here, the balance substance 142 is connected to the protruding structure 132a through the adhesive 144, which means that the balance substance 142 is not directly connected to the protruding structure 132a, but indirectly connected to the protruding structure 132a through the adhesive 144. In addition, the protruding structure 132a of this embodiment has a first region A1 and a second region A2, and the range (or area) of the first region A1 is larger than the range (or area) of the second region A2, and the balance component 140 is located in the second region A2.

When the curing beam is incident on the balance component 140 and part of the adhesive 144 is shielded by the balance substance 142, causing the curing beam not be able to irradiate the shielded part of the adhesive 144, there is a gap S1 between the protruding structures 132a, which allows for a large distance between the balance substance 142 and the configuration surface 131a. Moreover, these gaps S1 can play a role similar to a light channel, which facilitates the curing beam to irradiate the adhesive 144 under the balance substance 142 more uniformly and thoroughly. In this manner, the bonding area and bonding strength of the adhesive 144 can be increased. In other words, there is a gap S1 between the protruding structures 132a of the clamping element 130a. Therefore, when the curing beam is incident, the balance substance 142 shields less area, and the adhesive 144 can be completely cured. It can be obtained from experiments that the protruding structure 132a of the clamping element 130a can increase the bonding area of the adhesive 144 by about 50%, so as to increase the bonding strength between the balance component 140 and the clamping element 130a.

Furthermore, the protruding structure 132a can further increase the contact area between the surface of the clamping element 130a and the air, thereby improving the heat dissipation effect of the clamping element 130a. Although the protruding structure 132a located in the second region A2 and shielded by the balance component 140 cannot directly contact the air, the exposed protruding structure 132a located in the first region A1 can achieve this effect. It can be obtained from experiments that the protruding structure 132a of the clamping element 130a increases the surface area by about 30%, and can be regarded as a turbulent structure, which can effectively improve the heat dissipation effect of the clamping element 130a and reduce the temperature of the clamping element 130a.

In short, the protruding structure 132a of the clamping element 130a of this embodiment not only can increase the bonding area and bonding strength of the adhesive 144, but also has the turbulence function, which can increase the heat dissipation efficiency of the clamping element 130a.

In addition, the clamping element 130a of this embodiment further has a rear surface 133a opposite to the configuration surface 131a, and the clamping element 130a further includes a plurality of recessed structures 134a, and the recessed structures 134a are distributed on the rear surface 133a. The shape of the recessed structure 134a is, for example, a cylindrical shape, a strip shape, or a combination of the foregoing. The strip shape may be a straight strip shape or a curved strip shape, but the disclosure provides no limitation to the shape of the recessed structure 134a. The orthographic projection of the recessed structure 134a on the configuration surface 131a of this embodiment completely overlaps the protruding structure 132a. In other words, the plurality of recessed structures 134a are also arranged at equal intervals. Preferably, the depth D of each recessed structure 134a is, for example, greater than or equal to 0.1 mm. In another embodiment, the depth D of the recessed structure 134a is equal to the height H of the protruding structure 132a. Furthermore, the wheel 100a of this embodiment further includes an adhesive layer 150 disposed between the substrate 110 and the clamping element 130a. Since the plurality of recessed structures 134a are arranged at equal intervals, there are a plurality of gaps S2 between the plurality of recessed structures 134a, and the adhesive layer 150 is provided to fill the gap S2, so that the clamping element 130a is fixed on the substrate 110 through the adhesive properties of the adhesive layer 150.

Further, in this embodiment, since the gap S2 of the recessed structure 134a is filled with the adhesive layer 150, the clamping element 130a can be adhered to the substrate 110 through the adhesive layer 150. It can be obtained from experiments that the recessed structure 134a of the clamping element 130a can increase the bonding area of the adhesive layer 150 by about 25%, so as to increase the bonding strength between the clamping element 130a and the substrate 110. Furthermore, the recessed structure 134a of the clamping element 130a has a heat insulation effect, which can reduce the temperature of the clamping element 130a to increase the bonding strength and service life of the adhesive 144 In other words, the recessed structure 134a of the clamping element 130a of the embodiment not only can increase the bonding strength of the adhesive layer 150, but also increases the thermal resistance of the clamping element 130a, so as to reduce the thermal energy conducted from the substrate 110 to the clamping element 130a.

In short, in this embodiment, either the protruding structure 132a or the recessed structure 134a of the clamping element 130a can respectively increase the contact area between the clamping element 130a and the adhesive 144 as well as the contact area between the clamping element 130a and the adhesive layer 150, thereby improving the bonding effect of the clamping element 130a, and preventing the clamping element 130a and the balance component 140 from detaching when the wheel 100a rotates at a high speed.

It must be noted here that the following embodiments adopt the reference numbers and part of the content of the foregoing embodiments, and the same reference numbers are adopted to represent the same or similar elements, and the description of the same technical content is omitted. For the description of the omitted parts, reference may be derived from the foregoing embodiments, and no further description is incorporated in the following embodiments.

Figure 3B:
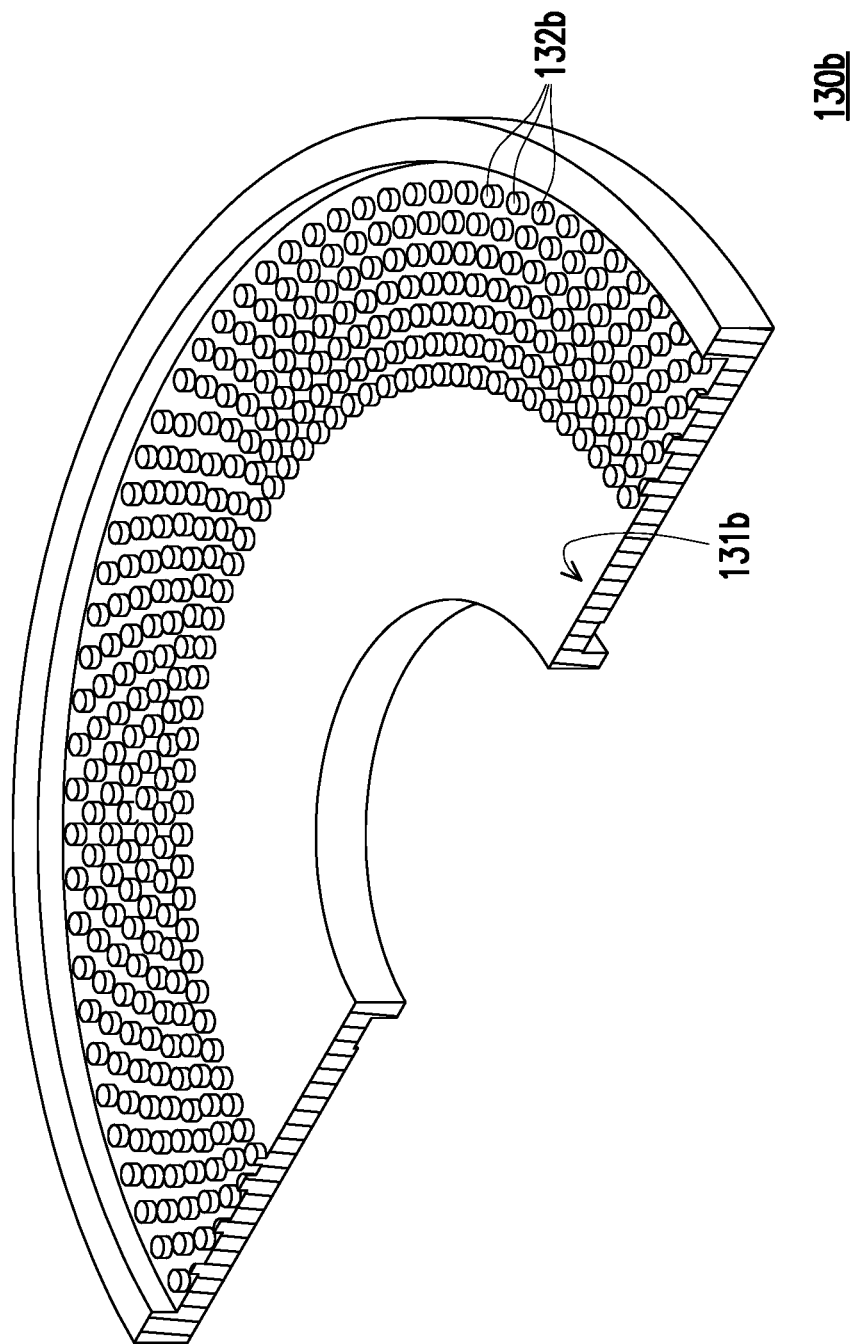
FIG. 3B is a schematic three-dimensional cross-sectional view of the clamping element of FIG. 3A.

FIG. 3A is a schematic top view of a clamping element according to an embodiment of the disclosure. FIG. 3B is a schematic three-dimensional cross-sectional view of the clamping element of FIG. 3A. Please refer to FIG. 2B, FIG. 3A and FIG. 3B at the same time. The clamping element 130b of this embodiment is similar to the clamping element 130a of FIG. 2B, and the difference between the two lies in: in the clamping element 130b of this example, only the protruding structure 132b is distributed on the configuration surface 131b, and the shape of the protruding structure 132b is embodied as a cylindrical shape.

Figure 4B:
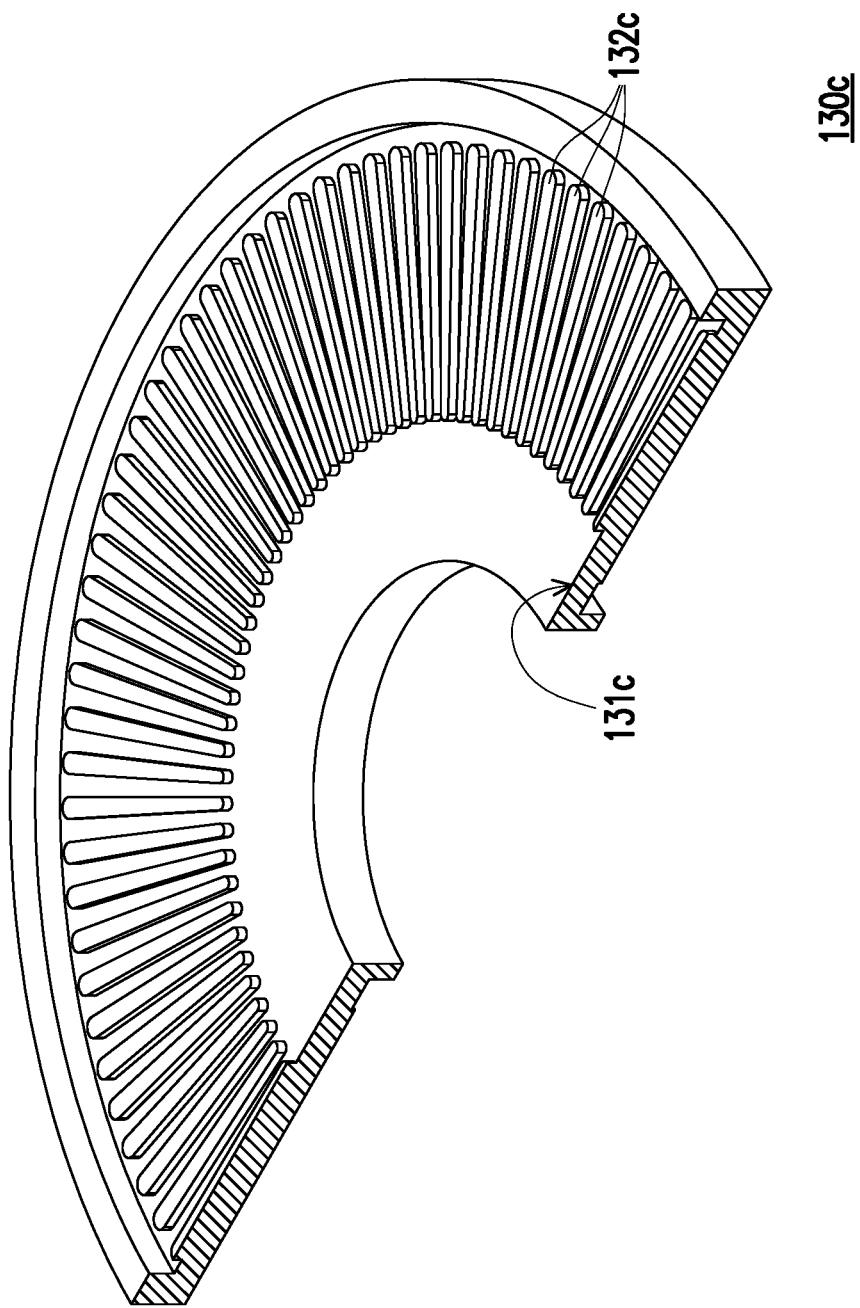
FIG. 4B is a schematic three-dimensional cross-sectional view of the clamping element of FIG. 4A.

FIG. 4A is a schematic top view of a clamping element according to another embodiment of the disclosure. FIG. 4B is a schematic three-dimensional cross-sectional view of the clamping element of FIG. 4A. Please refer to FIG. 2B, FIG. 4A and FIG. 4B at the same time. The clamping element 130c of this embodiment is similar to the clamping element 130a of FIG. 2B, and the difference between the two lies in: in the clamping element 130c of this example, only the protruding structure 132c is distributed on the configuration surface 131c, and the shape of the protruding structure 132c is embodied as a long strip.

Figure 5A:
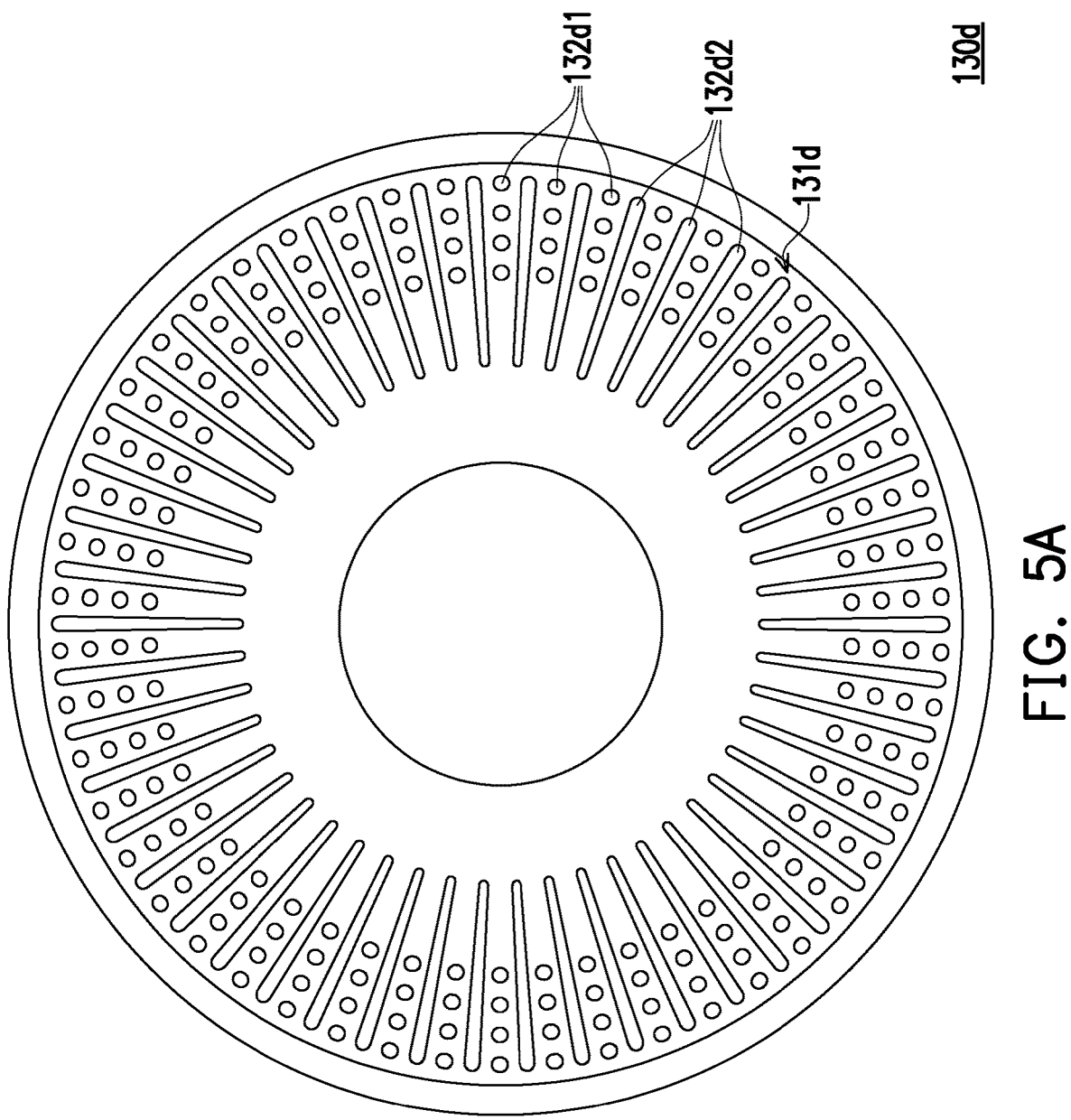
FIG. 5A is a schematic top view of a clamping element according to another embodiment of the disclosure.
Figure 5B:
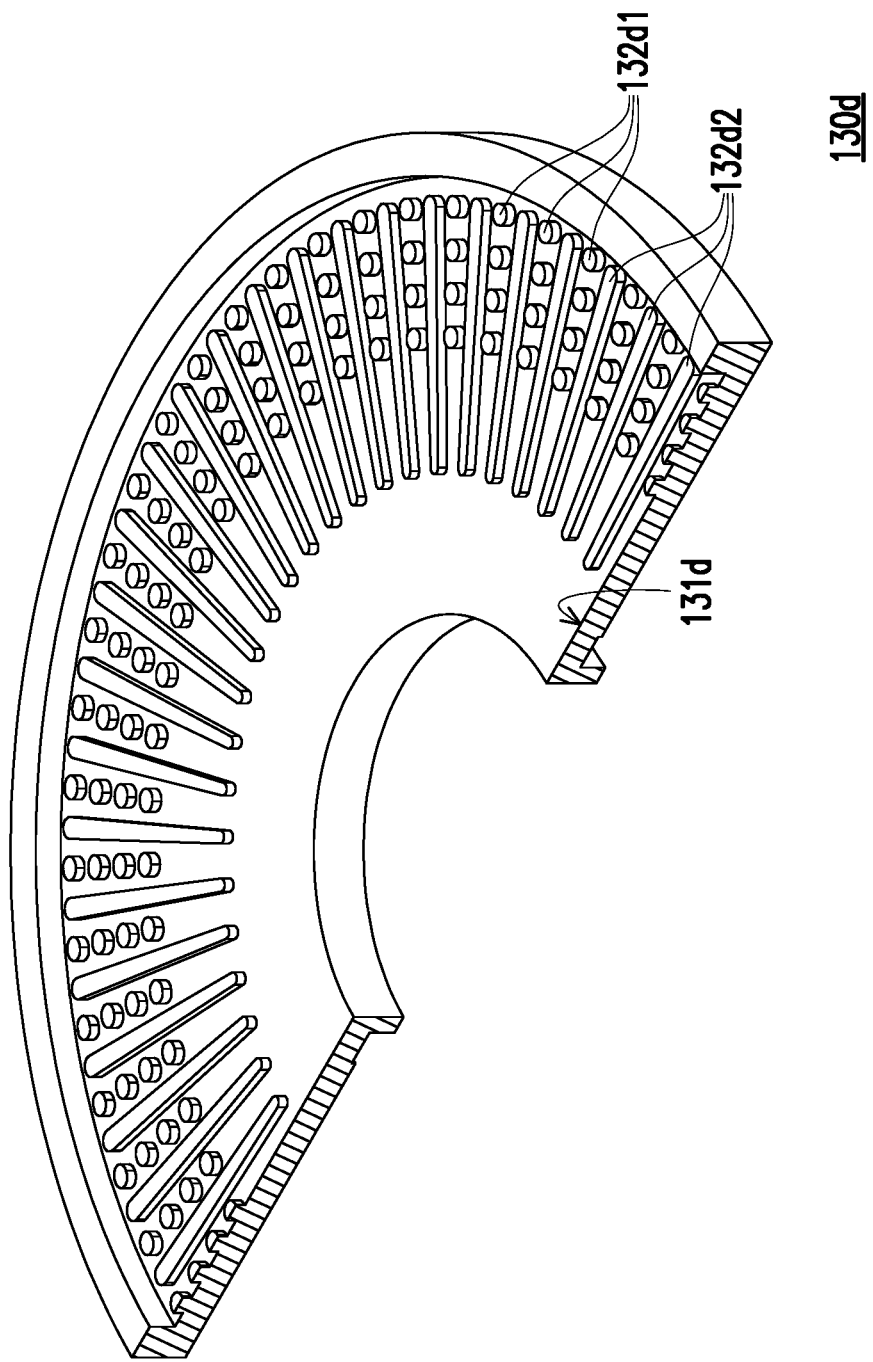
FIG. 5B is a schematic three-dimensional cross-sectional view of the clamping element of FIG. 5A.

FIG. 5A is a schematic top view of a clamping element according to another embodiment of the disclosure. FIG. 5B is a schematic three-dimensional cross-sectional view of the clamping element of FIG. 5A. Please refer to FIG. 2B, FIG. 5A and FIG. 5B at the same time. The clamping element 130d of this embodiment is similar to the clamping element 130a of FIG. 2B, and the difference between the two lies in: in the clamping element 130d of this example, only the protruding structures 132d1 and 132d2 are distributed on the configuration surface 131d, and the shape of the protruding structure 132d1 is embodied as a cylindrical shape, and the shape of the protruding structure 132d2 is embodied as a long strip.

Figure 6A:
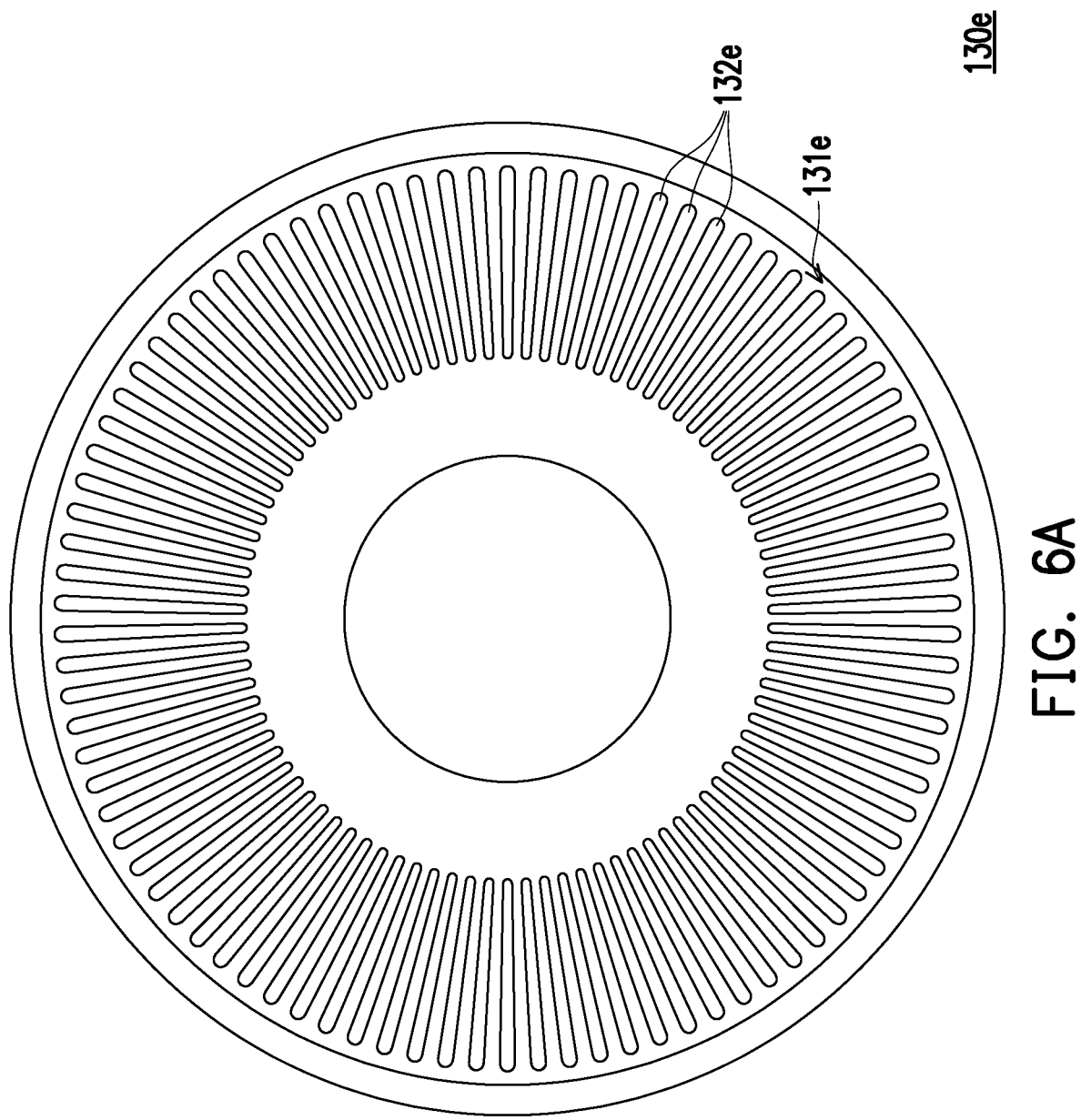
FIG. 6A is a schematic top view of a clamping element according to another embodiment of the disclosure.
Figure 6B:
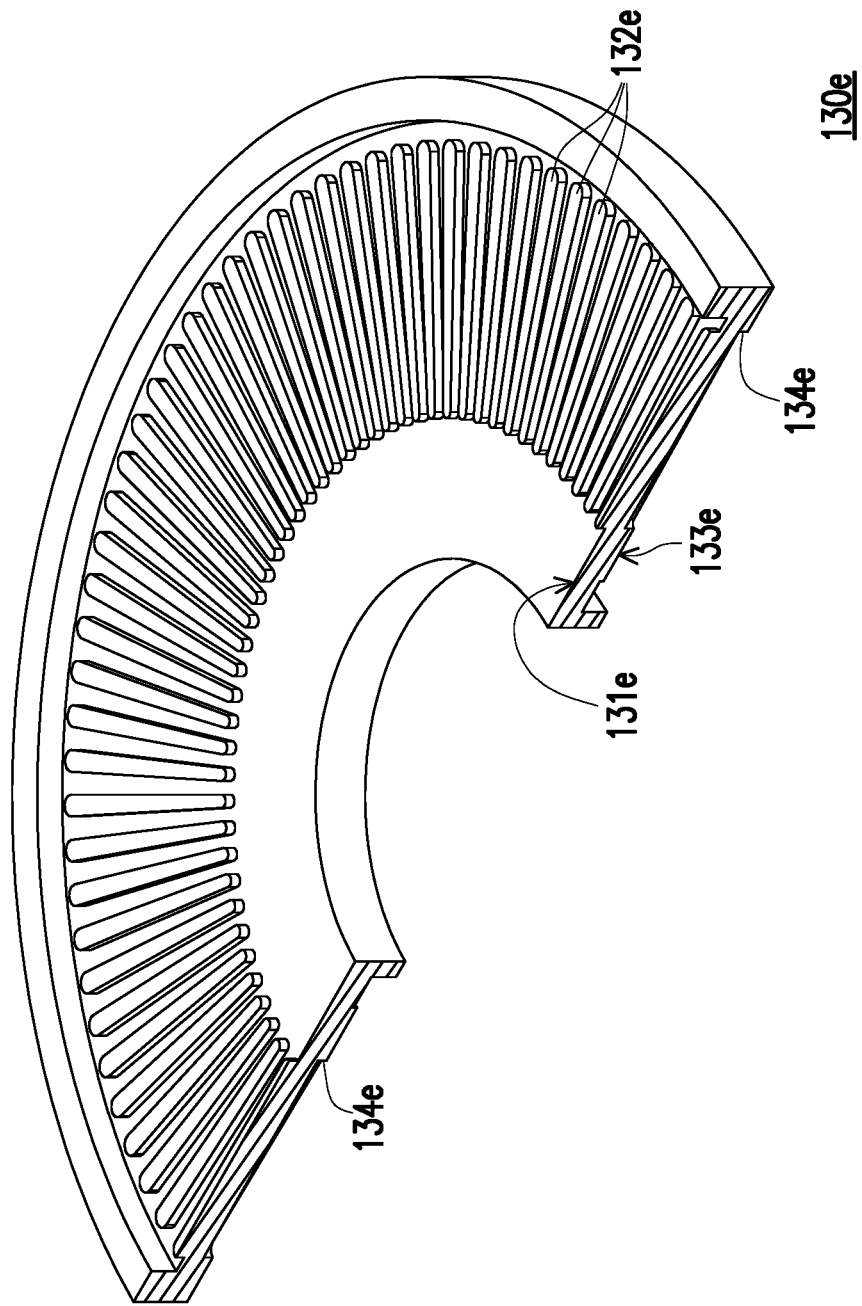
FIG. 6B is a schematic three-dimensional cross-sectional view of the clamping element of FIG. 6A.

FIG. 6A is a schematic top view of a clamping element according to another embodiment of the disclosure. FIG. 6B is a schematic three-dimensional cross-sectional view of the clamping element of FIG. 6A. Please refer to FIG. 2B, FIG. 6A and FIG. 6B at the same time. The clamping element 130e of this embodiment is similar to the clamping element 130a of FIG. 2B, and the difference between the two lies in: the clamping element 130e of this example has protruding structure 132e distributed on the configuration surface 131e, and also has recessed structure 134e distributed on the rear surface 133e. Here, the shape of the protruding structure 132e and the shape of the recessed structure 134e are embodied as long strips, respectively.

Figure 7A:
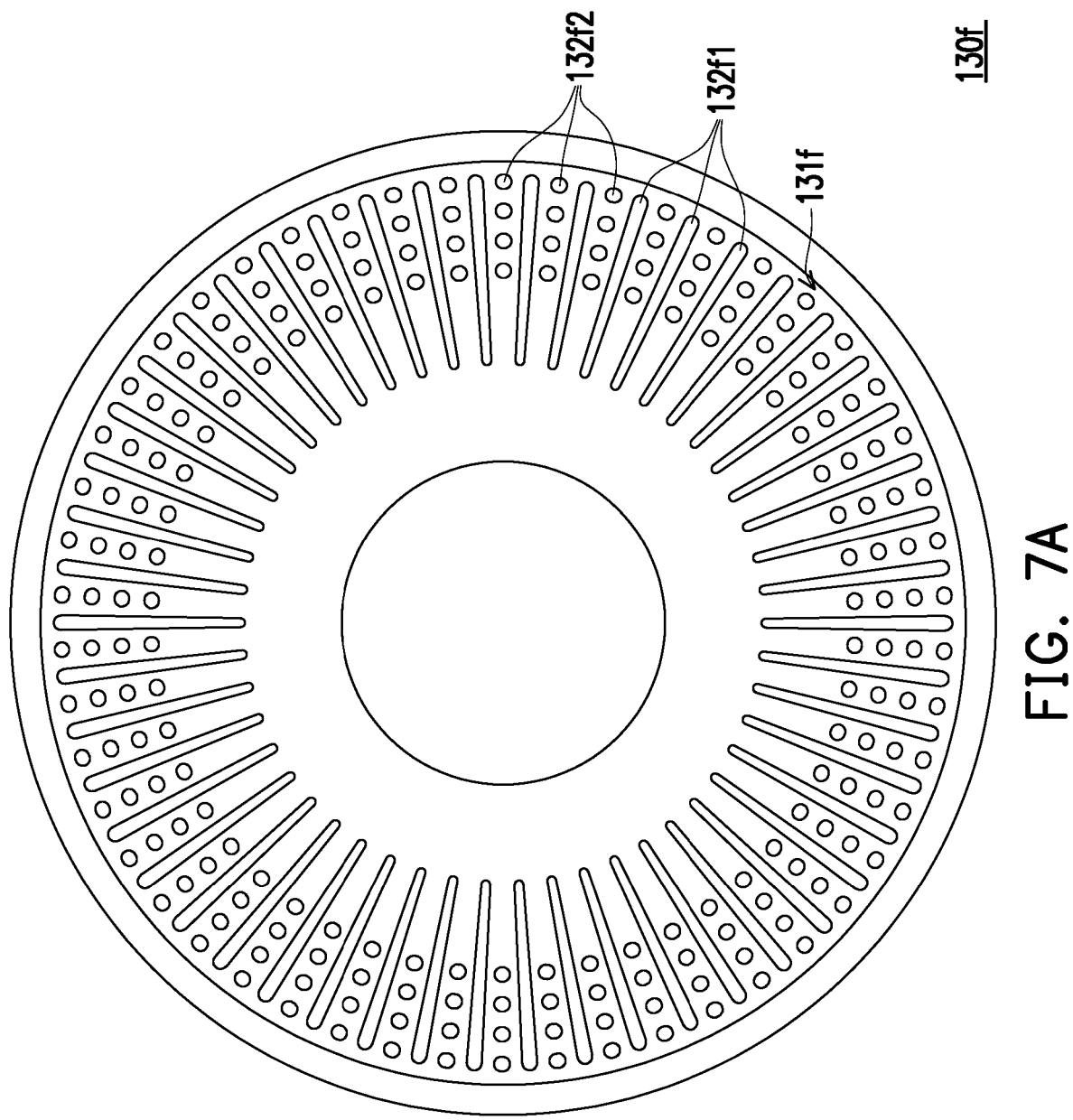
FIG. 7A is a schematic top view of a clamping element according to another embodiment of the disclosure.
Figure 7B:
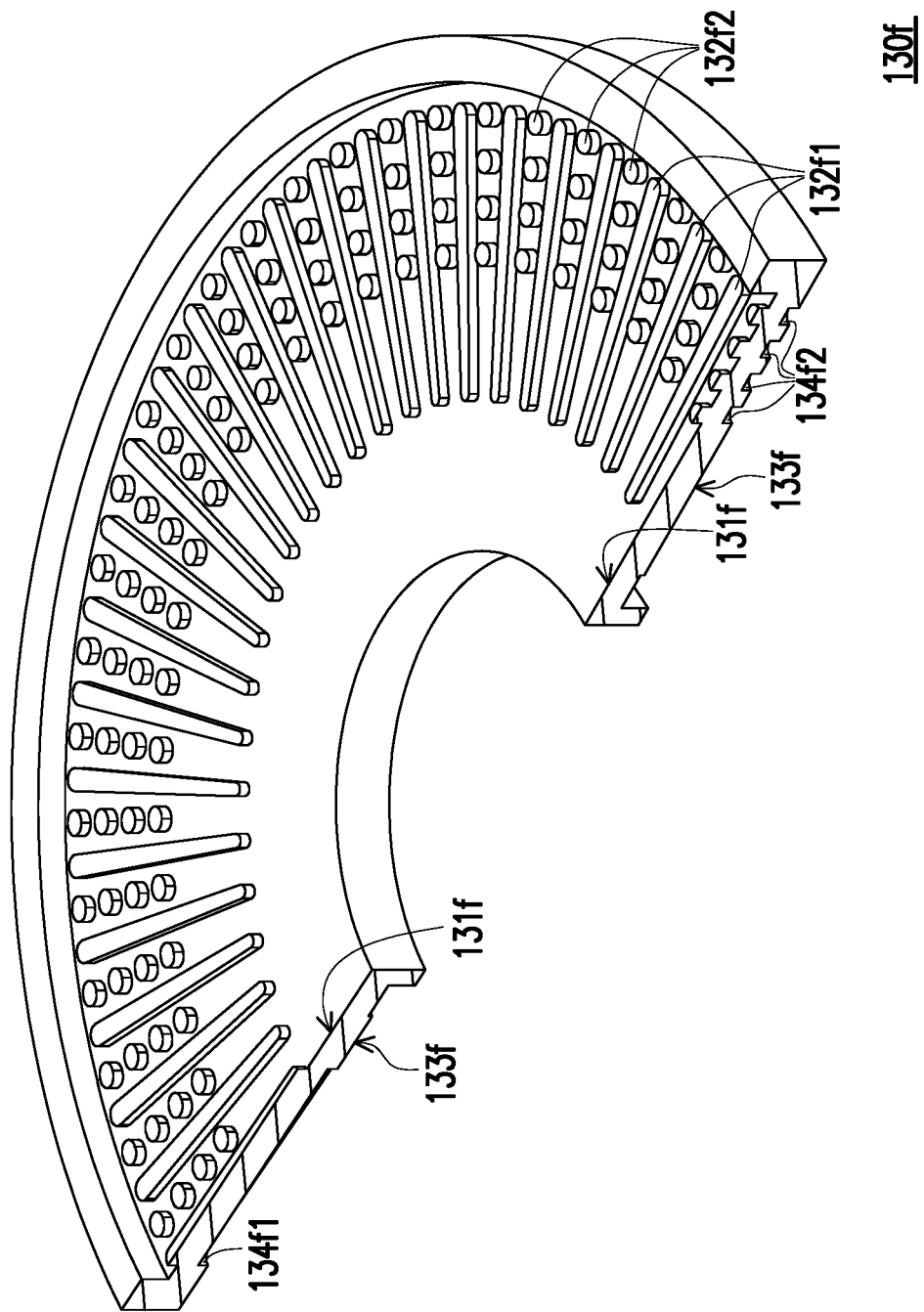
FIG. 7B is a schematic three-dimensional cross-sectional view of the clamping element of FIG. 7A.

FIG. 7A is a schematic top view of a clamping element according to another embodiment of the disclosure. FIG. 7B is a schematic three-dimensional cross-sectional view of the clamping element of FIG. 7A. Please refer to FIG. 2B, FIG. 7A and FIG. 7B at the same time. The clamping element 130f of this embodiment is similar to the clamping element 130a of FIG. 2B, and the difference between the two lies in: the clamping element 130f of this example has protruding structures 132f1 and 132f2 distributed on the configuration surface 131f, and also has recessed structures 134f1 and 134f2 distributed on the rear surface 133f. Here, the shape of the protruding structure 132f1 and the shape of the recessed structure 134f1 are strip respectively, and the shape of the protruding structure 132f2 and the shape of the recessed structure 134f2 are cylindrical respectively.

In the 3D simulation experiment, the conventional clamping element is a conventional clamping ring, the oppositely arranged configuration surface and rear surface of the conventional clamping ring are both flat. Using the conventional clamping ring as a reference (100%) for simulation calculation. The following Table 1 clearly shows that the bonding area ratio of the adhesive 144 of the clamping elements 130a, 130b, 130c, 130d, 130e, and 130f of this embodiment is about 150% of the conventional clamping ring. The ratio of the shielding area between the region under the balance substance 142 and the clamping elements 130a, 130b, 130c, 130d, 130e, and 130f is about 23% to 54% of the conventional clamping ring. According to the bonding strength data of the adhesive 144, the ratio of the tension data in this embodiment is about 177% to 213% of the ratio of the conventional tension data.

TABLE 1

| Form of clamping element | Adhesive Bonding area (mm²) | Ratio of bonding area (%) | Between the region under the balance substance and the clamping element Shielding area (mm²) | Ratio of shielding area (%) | Bonding strength of adhesive Tension data (kgf) | Ratio of tension data (%) |
| --- | --- | --- | --- | --- | --- | --- |
| Conventional clamping ring | 58.80 | 100 | 37.71 | 100 | 12.30 | 100 |
| clamping elements 130a & 130b | 89.38 | 152 | 8.75 | 23.2 | 26.23 | 213.3 |
| clamping elements 130c & 130e | 85.95 | 146.2 | 20.52 | 54.4 | 21.88 | 177.9 |
| clamping elements 130d & 130f | 87.26 | 148.4 | 17.64 | 46.8 | 24.94 | 202.8 |

Furthermore, the conventional clamping ring is used as a reference (100%) for the simulation calculation. The following Table 2 clearly shows that the bonding area ratio of the adhesive layer 150 of the clamping elements 130a, 130e, and 130f of this embodiment is about 125% of the conventional clamping ring. In other words, the recessed structures 134a, 134e, 134f1, and 134f2 of the clamping elements 130a, 130e, and 130f can increase the bonding area of the adhesive layer 150 by about 25%, and increase the bonding strength between the clamping elements 130a, 130e, and 130f and the substrate 110.

TABLE 2

| Form of clamping element | Adhesive layer Bonding area (mm²) | Ratio of bonding area (%) | Bonding strength of adhesive layer Tension data (kgf) | Ratio of tension data (%) |
| --- | --- | --- | --- | --- |
| Conventional clamping ring | 923.51 | 100 | 31.56 | 100 |
| clamping element 130a | 1161.17 | 125.7 | 41.21 | 130.6 |
| clamping element 130e | 1212.08 | 131.2 | 44.65 | 141.5 |
| clamping element 130f | 1162.69 | 125.9 | 42.88 | 135.9 |

In addition, the thermal resistance formula is $R=L/kA$, wherein R is the thermal resistance (K/W), L is the forward distance (m) in the direction of the axis X (shown in FIG. 2B), k is the thermal conductivity (W/m·K), and A is a cross-sectional area (m²). The heat conduction formula $Q=kA(\Delta T/L)$ is incorporated into the thermal resistance formula $R=L/kA$, $R=\Delta T/Q$, $\Delta T=RQ$ can be obtained, wherein R is thermal resistance (K/W), Q is heat (W), and ΔT is the temperature difference (K). According to the thermal resistance formula, the simulation calculation is performed based on the conventional wheel as reference (100%). Here, the conventional wheel and the wheel including the clamping elements 130a, 130e, and 130f of this embodiment are all embodied as a phosphor wheel including a wavelength conversion layer. As clearly shown in Table 3, Table 4 and Table 5 below, the total thermal resistance of the conventional wheel is 1.05 K/W (i.e., 0.284630 K/W+0.001120 K/W+0.757576 K/W+0.006734 K/W). The total thermal resistance of the wheel including the clamping elements 130a, 130e, and 130f of this embodiment is 2.56 K/W (that is, 0.284630 K/W+0.001120 K/W+0.757576 K/W+1.515152 K/W+0.001684 K/W+0.006734 K/W). In other words, the total thermal resistance of the wheel including the clamping elements 130a, 130e, and 130f in this embodiment is increased by about 244% (that is, 2.566895/1.050060×100%) compared to the conventional wheel. If the total thermal resistance is then incorporated into the heat conduction formula, the temperature difference between the conventional wheel and the wheel of this embodiment can be obtained. The temperature of the wheel including clamping elements 130a, 130e, and 130f in this embodiment is lower than that of the conventional wheel by 15.17° C. (i.e., 25.67° C.-10.50° C.). In other words, the wheel including the clamping elements 130a, 130e, and 130f of the embodiment has a heat insulation effect, which can reduce the temperature and increase the bonding strength and service life of the adhesive 144.

TABLE 3

| Conventional wheel | Thermal conductivity (W/m · K) | Forward distance (m) | Cross-sectional area (m²) | Thermal resistance (K/W) |
| --- | --- | --- | --- | --- |
| Wavelength conversion layer | 0.5 | 0.000150 | 0.001054 | 0.284630 |
| Substrate | 220 | 0.000700 | 0.002840 | 0.001120 |
| Adhesive layer | 0.2 | 0.000100 | 0.000660 | 0.757576 |
| Clamping ring | 180 | 0.000800 | 0.000660 | 0.006734 |

TABLE 4

| Wheel of present embodiment | Thermal conductivity (W/m · K) | Forward distance (m) | Cross-sectional area (m²) | Thermal resistance (K/W) |
| --- | --- | --- | --- | --- |
| Wavelength conversion layer | 0.5 | 0.000150 | 0.001054 | 0.284630 |
| Substrate 110 | 220 | 0.000700 | 0.002840 | 0.001120 |
| Adhesive layer 150 | 0.2 | 0.000100 | 0.000660 | 0.757576 |
| Recessed structure 134a,134e, 134f1,134f2 | 0.2 | 0.000200 | 0.000660 | 1.515152 |
| Protruding structure 132a,132e, 132f1,132f2 | 180 | 0.000200 | 0.000660 | 0.001684 |
| clamping element 130a,130e, 130f | 180 | 0.000800 | 0.000660 | 0.006734 |

TABLE 5

| | Heat (W) | Total thermal resistance (K/W) | ΔT (° C.) |
|---|---|---|---|
| Conventional wheel | 10 | 1.050060 | 10.50 |
| Wheel of present embodiment | 10 | 2.566895 | 25.67 |

In summary, the embodiments of the disclosure have at least one of the following advantages or effects. In the design of the wheel of the disclosure, the clamping element includes a protruding structure, and the balance substance of the balance component is arranged on the protruding structure, and the adhesive of the balance component covers the balance substance and the protruding structure to fix the balance component on the clamping element. With the design of the protruding structure, the bonding area between the adhesive and the clamping element as well as the bonding strength can be increased, so that the wheel of the disclosure can have better structural reliability. Furthermore, the design of the protruding structure also has a turbulence function, which can effectively improve the heat dissipation efficiency of the wheel of the disclosure. In addition, the projection device using the wheel of the disclosure can have better projection quality and product competitiveness.

The foregoing description of the preferred embodiments of the disclosure has been presented for purposes of illustration and description. It is not intended to be exhaustive or to limit the exemplary disclosure to the precise form or to embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A wheel, comprising: a substrate, a driving component, a clamping element and a balance component; wherein
   the driving component is connected to the substrate, and is configured to drive the substrate to rotate about an axis of the driving component as a central axis;
   the clamping element is arranged on the substrate along the axis, and the clamping element comprises a plurality of protruding structures; and
   the balance component comprises a balance substance and an adhesive, the balance substance is disposed on the plurality of protruding structures, and the plurality of protruding structures are located in a first region and a second region, the balance component is only located in at least part of the second region, the plurality of protruding structures located in the first region are exposed and not covered by the adhesive, and the adhesive covers the balance substance and the plurality of protruding structures located in the second region to fix the balance component on the clamping element.

2. The wheel according to claim 1, wherein there are a plurality of gaps between the plurality of protruding structures, and the adhesive is filled in the plurality of gaps to fix the balance component on the clamping element.

3. The wheel according to claim 1, wherein the balance substance is connected to the plurality of protruding structures through the adhesive.

4. The wheel according to claim 1, wherein the plurality of protruding structures are arranged in a ring shape at equal intervals.

5. The wheel according to claim 1, wherein the clamping element has a configuration surface, and the plurality of protruding structures are distributed on the configuration surface.

6. The wheel according to claim 5, wherein the clamping element further has a rear surface opposite to the configuration surface, the clamping element further comprises a plurality of recessed structures, and the plurality of recessed structures are distributed on the rear surface.

7. The wheel according to claim 6, wherein a depth of each of the plurality of recessed structures is greater than or equal to 0.1 mm.

8. The wheel according to claim 6, further comprising:
   an adhesive layer, disposed between the substrate and the clamping element, wherein there are a plurality of gaps between the plurality of recessed structures, and the adhesive layer fills the plurality of gaps to fix the clamping element on the substrate.

9. The wheel according to claim 6, wherein an orthographic projection of the plurality of recessed structures on the configuration surface completely overlaps the plurality of protruding structures.

10. The wheel according to claim 1, wherein a height of each of the plurality of protruding structures is greater than or equal to 0.1 mm.

11. The wheel according to claim 1, wherein a range of the first region is larger than a range of the second region.

12. The wheel according to claim 1, wherein a shape of the substrate and a shape of the clamping element are hollow rings, respectively, and the substrate and the clamping element are respectively arranged coaxially with the driving component.

13. A wheel, comprising: a substrate, a driving component, a clamping element and a balance component; wherein the driving component is connected to the substrate, and is configured to drive the substrate to rotate about an axis of the driving component as a central axis;

the clamping element is arranged on the substrate along the axis, and the clamping element comprises a plurality of protruding structures; and the balance component comprises a balance substance and an adhesive, the balance substance is disposed on the plurality of protruding structures, and the adhesive covers the balance substance and at least part of the plurality of protruding structures to fix the balance component on the clamping element; and wherein the clamping element further has a rear surface opposite to the configuration surface, the clamping element further comprises a plurality of recessed structures, and the plurality of recessed structures are distributed on the rear surface; and wherein a shape of the plurality of recessed structures comprises a cylindrical shape, a strip shape, or a combination of the foregoing.

14. A wheel, comprising: a substrate, a driving component, a clamping element and a balance component; wherein the driving component is connected to the substrate, and is configured to drive the substrate to rotate about an axis of the driving component as a central axis;

the clamping element is arranged on the substrate along the axis, and the clamping element comprises a plurality of protruding structures wherein a shape of the plurality of protruding structures comprises a cylindrical shape, a strip shape, or a combination of the foregoing; and the balance component comprises a balance substance and an adhesive, the balance substance is disposed on the plurality of protruding structures, and the adhesive covers the balance substance and at least part of the plurality of protruding structures to fix the balance component on the clamping element.

15. A projection device, comprising: an illumination module, a light valve, and a projection lens; wherein, the illumination module comprises a light source device and a wheel, the illumination module is configured to provide an illumination beam, wherein the wheel is disposed on a transmission path of an excitation beam provided by the light source device, and the wheel comprises a substrate, a driving component, a clamping element, and a balance component; wherein the driving component is connected to the substrate, and is configured to drive the substrate to rotate about an axis of the driving component as a central axis;

the clamping element is arranged on the substrate along the axis, and the clamping element comprises a plurality of protruding structures; and the balance component comprises a balance substance and an adhesive, the balance substance is disposed on the plurality of protruding structures, and the plurality of protruding structures are located in a first region and a second region, the balance component is only located in at least part of the second region, the plurality of protruding structures located in the first region are exposed and not covered by the adhesive, and the adhesive covers the balance substance and the plurality of protruding structures located in the second region to fix the balance component on the clamping element;

the light valve is arranged on a transmission path of the illumination beam from the wheel to convert the illumination beam into an image beam; and the projection lens is arranged on a transmission path of the image beam to project the image beam out of the projection device.

* * * * *